Aug. 16, 1949.  A. V. MOTSINGER  2,478,936
FACEPIECE CANISTER ATTACHMENT
Filed Aug. 10, 1942  2 Sheets-Sheet 1
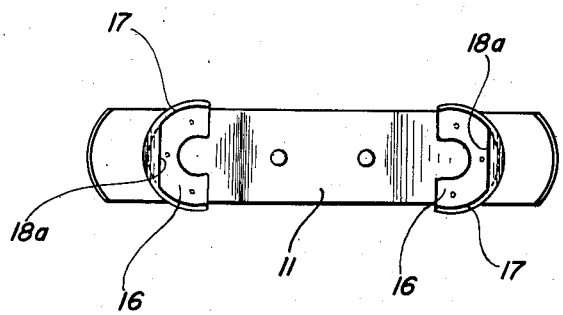
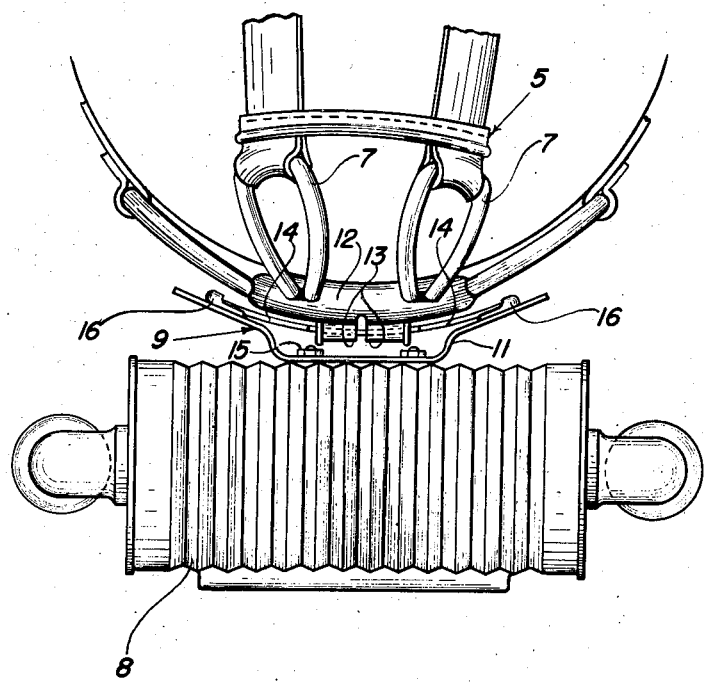
Inventor
A. V. Motsinger
By Joseph A. O'Connell
and Fred S. Lockwood Attorneys Aug. 16, 1949.  A. V. MOTSINGER  2,478,936
FACEPIECE CANISTER ATTACHMENT Filed Aug. 10, 1942  2 Sheets-Sheet 2

Inventor

A. V. Motsinger

By Joseph A. O'Connell
and Fred S. Lockwood Attorneys

Patented Aug. 16, 1949

2,478,936

UNITED STATES PATENT OFFICE 2,478,936

FACEPIECE CANISTER ATTACHMENT

Armand V. Motsinger, Aberdeen, Md.

Application August 10, 1942, Serial No. 454,260

3 Claims. (Cl. 128—140)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for, and methods of supporting a canister in an efficient and effective position relative to the facepiece of a gas mask.

Under certain conditions it is advantageous to support the canister in a carrier suspended at the side of the wearer, with a flexible hose connection between the canister and the facepiece. There are, however, certain objections to this so-called type of "side carried" canister. Among these objections may be mentioned two; namely, interference with body movements, and tendency of the hose to catch onto objects.

An alternate manner of carrying the canister, and one which is notably free of the objections specifically mentioned in the preceding paragraph, involves locating the canister at the back of the head of the wearer, with the canister supported directly by the head harness. This alternative, while affording as it does, greater freedom of body movement and results in the locating of the air hose or tube so as to reduce to a minimum the likelihood of the same becoming engaged with extraneous objects, is not without certain disadvantages.

Tendency of the "head carried" type of canister to rotate or swing laterally, to become easily displaced, and to interfere with the efficient use and adjustment of the protective hood, are some of the things that militate against such type of canister as is now known and used.

The primary object of this invention is to overcome the objections, those herein enumerated and others known well to those skilled in this art, to such prior art types of "head carried" canisters, and to that end the invention resides in the provision of an improved fastener for securing the canister to the head harness, and in a more efficient method of attaching to, or associating the fastener with the head harness.

The invention together with its object and advantages will be best understood from a study of the following description taken in connection with the accompanying drawings wherein:

Figure 1 is a top plain view illustrating an application of this invention.

Figure 2 is an elevational view of a fastener plate forming part of the invention.

Figure 3:
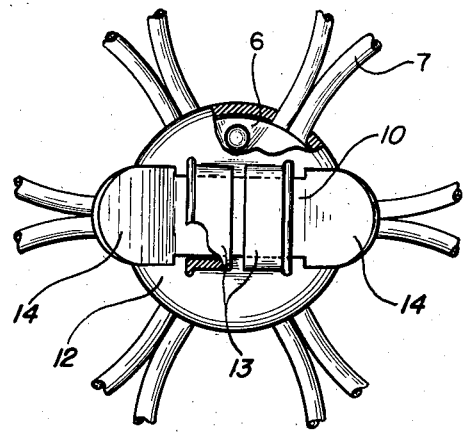
Figure 3 is a fragmentary elevational view of the head pad of a head harness, with certain parts broken away and illustrating one manner of associating the fastener of this invention with the head pad.

Referring more in detail to the drawings, 5 indicates generally a portion of a head harness for a gas mask such as disclosed in my Reissue Patent No. 20,211 and characterized by the provision of an independent positioning element 6 that serves as a head pad to bear against the back of the head of the wearer when the mask is in use, and also for maintaining the flexible or elastic retaining members 7 in predetermined spaced relation on the head. Since the parts just referred to are not of the essence of this invention, further detailed description thereof is deemed unnecessary.

For reasons well known to those skilled in the art, it is sometimes desirable to carry the air-purifying canister 8 of a gas mask at the back of the head instead of in a carrier disposed at the side of the wearer. As set forth in the statement of the invention, the immediate concern of this invention is the mounting of the canister 8 at the back of the head.

To the end just stated, there is provided a fastener indicated generally by the reference numeral 9.

In the illustrated embodiment thereof, the fastener 9 comprises a resilient, metallic plate 10 adapted to be mounted on the head pad 6 as hereinafter detailed, and a resilient metallic plate 11 complementing the plate 10 and adapted to be mounted on the canister 8.

Plates 10 and 11 are complementarily equipped to provide for a quick detachable connection there-between, and one which will positively prevent any accidental relative movement of the plates.

For mounting the fastener plate 10 on the head pad 6 there is provided an attaching element or cap 12 that is preferably formed of rubber, but which can be formed of any suitable elastic and readily moldable material. The cap 12 may be applied to the pad 6 in any way found most desirable and advantageous, and in such a manner as to completely envelop the pad 6 as shown in Figure 3.

In the periphery thereof, cap 12 is provided with circumferentially spaced openings, as shown, to accommodate the elastic retaining elements 7 with which pad 6 is associated.

Cap 12 has moldably formed thereon a pair of slightly spaced, aligned loops 13 through which the plate 10 extends as is shown in Figure 3. It will thus be seen that plate 10 is held in position relative to the head pad 6 against untoward shifting or rotative movement.

The plate 10 is longitudinally curved or bowed to conform somewhat to the contour of the head as suggested in Figure 1. Also, at the free ends thereof plate 10 is enlarged as at 14—14, and the extremities of said enlarged ends are preferably rounded as illustrated.

Fastener plate 11 is substantially in the form of a metallic strip longitudinally curved or bowed to substantially complement the curvature of the plate at 10. However, intermediate its ends, plate 11 is fashioned into a relatively shallow substantial U and at the bight of the U is fixedly secured to the canister 8 through the medium of suitable fastening elements 15 as shown.

For receiving the ends 14 of fastener plate 10, fastener plate 11 inwardly from the respective opposite ends thereof is provided with flanged elements 16 that co-act with the ends 14 of plate 10 in detachably securing these fastener plates together.

The elements 16 are in the form of plates riveted or otherwise suitably secured to the plate 10 at the concave side of the latter, and these plate-like elements have rounded edges provided with flanges 17 which conformably accommodate within the confines thereof the rounded edge portions of terminals 14 of plate 10. The flanges 17 and associated plate elements form sockets into which the terminals 14 of plate 10 are insertable, and at the inner ends of these sockets overlying flange sections 18a serve to effectively retain the plate ends 14 within the aforementioned sockets.

From the foregoing, it is apparent that it is a relatively simple matter to engage and disengage fastener plates 10 and 11 for effecting a placement or removal of the canister 8. To position the canister at the back of the head harness, all that is necessary is to press the canister in the direction of the head with the socket-equipped portions of plate 10 in the regions of the terminals 14 of plate 10, whereupon the terminals 14 will snap into position within the sockets 16 for effecting a coupling of the fastener plates.

It will also be apparent from the foregoing that with a fastener of this character, canister 8 is secured against accidental displacement and against swinging or rotating laterally in either direction.

As hereinbefore noted, objection to the use of the so-called "head carried" type canister resided mainly in its uselessness where protective clothing must be worn. In this connection it may be observed that under certain conditions in chemical warfare, resort must be had to clothing in the form of coveralls for protecting the skin against vesicant chemical warfare agents. Such clothing usually includes a protective hood worn over and substantially enveloping the head of the wearer. With a fastener contemplated by this invention, the wearing of such a protective hood is permissible.

Figure 4:
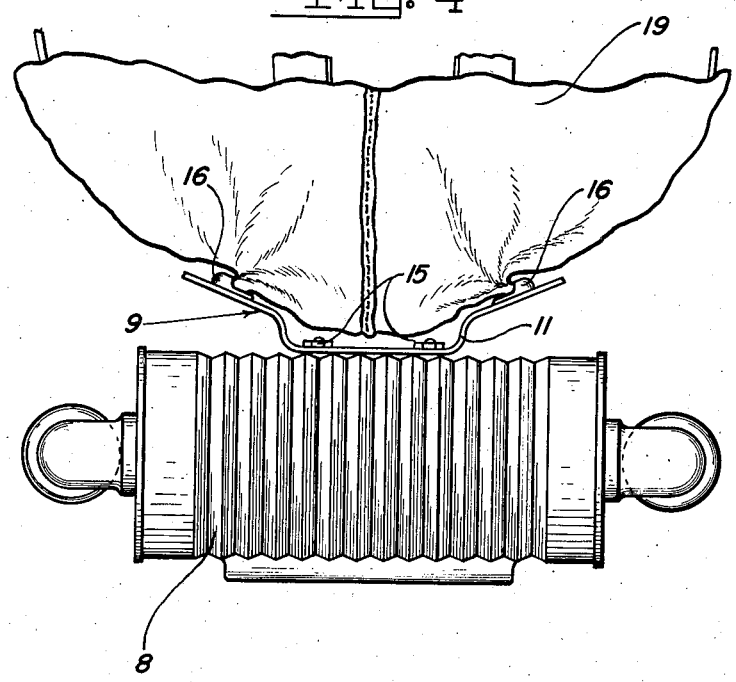
Figure 4 is a view similar to Figure 1 and illustrating a second application of the invention.

As shown in Figure 4 when the hood, therein fragmentarily illustrated and indicated by the reference numeral 19 is worn with the gas mask, fastener plate 10 is disposed within the hood. To mount the canister 8 in position under such circumstances, all that is necessary is to gather portions of the material of the hood about the terminals 14 of plate 10 as suggested whereupon the terminals 14 may then be readily engaged by the sockets 16 of plate 11.

It will thus be seen that the fastener in nowise requires perforation of the hood 19 and consequently does not detract from the protective value of the hood.

To remove the canister 8 from its position at the back of the head of the wearer, all that is required is to apply, with the fingers, pressure to the terminals of plate 11 for flexing the ends of the plate towards the canister 8. This will result in the sockets 16 sliding off of the terminals 14 and consequently a quick separation of the fastener plates.

Having thus described the invention, what is claimed is:

1. In a fastener of the character described, a cap member, a fastener plate secured thereto and having free ends, and an article-supporting fastener plate complemental to the first plate and having thereon spaced sockets into which the free ends of the first plate are adapted to spring for detachably securing the plates together.

2. For use in mounting an air-purifying canister on the head pad of a gas mask head harness, an elastic head pad-enveloping cap having spaced loops moldably formed thereon, a resilient fastener plate threaded through said loops, and a resilient canister-carrying fastener plate provided with sockets in which are removably insertable the ends of the first mentioned fastener plate.

3. A separable fastener comprising an attaching member of rubber or similar resilient material, a fastener plate carried by said member and having free ends, and an article-supporting fastener plate having spaced flange-equipped portions with which the free ends of the first fastener plate are engageable for detachably securing the plates together.

ARMAND V. MOTSINGER.

REFERENCES CITED

The following references are of record in the file of this patent:

UNITED STATES PATENTS

| Number | Name | Date |
|---|---|---|
| 650,962 | Adams | June 5, 1900 |
| 769,791 | Demsky | Sept. 13, 1904 |
| 1,509,531 | Sheriff | Sept. 23, 1924 |
| 1,942,442 | Motsinger | Jan. 9, 1934 |
| 2,148,431 | Brown | Feb. 28, 1939 |
| 2,222,635 | Smith | Nov. 26, 1940 |